Feb. 27, 1968   W. J. SIMONINI, JR   3,370,378
TOY PARACHUTE DEVICE
Filed Oct. 21, 1965
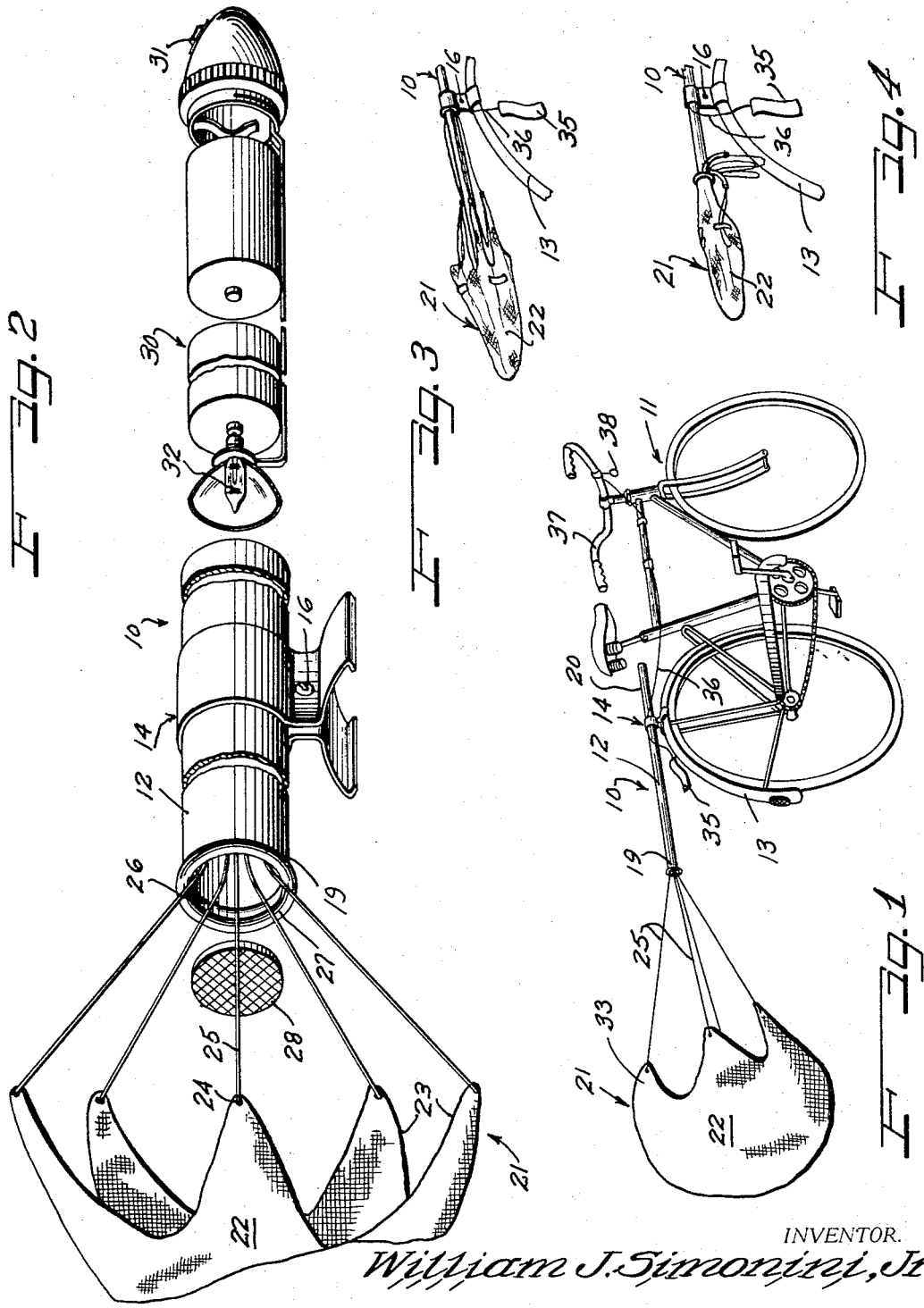
INVENTOR.
William J. Simonini, Jr.
BY Hill, Sherman, Meroni, Gross & Simpson  ATTORNEYS

United States Patent Office 3,370,378
Patented Feb. 27, 1968

3,370,378
TOY PARACHUTE DEVICE
William J. Simonini, Jr., 432 S. Hubbard St., Algonquin, Ill. 60102, assignor of one-half to Herbert D. Drain, Algonquin, Ill.
Filed Oct. 21, 1965, Ser. No. 500,052
7 Claims. (Cl. 46—228)

This invention relates to a toy parachute device and more particularly to a parachute device for use with a child's vehicle, such as a bicycle or other pedaled vehicle.

When in combination with a bicycle, my device includes a support member, such as a bracket, for attachment to the rear fender of the bicycle. The device itself may suitably be in the form of an elongated tube mounted on the vehicle by means of the support member and having attached to to the trailing end thereof a suitably sized parachute. Means are provided for releasably securing the parachute in a collapsed state to the casing, and manual means are provided, preferably mounted at the handle bars of the vehicle, for operating the release means and causing the parachute to assume an open position, all during movement of the vehicle. Additionally, searchlight means can be associated with the casing to illuminate the parachute when in open state trailing behind the vehicle.

The parachute toy device of my invention enables youngsters to take part in games on their bicycles or other pedaled vehicles in which the opening up of the parachutes plays a part, such as to signal the end of a simulated "drag" race. When provided with a searchlight, as in the preferred form of my invention, the toy device can be used in the dark to illuminate the parachute and obtain pleasing effects by the use of differently colored parachutes.

It is, therefore, an important object of this invention to provide a toy parachute device for use with a child's vehicles, and particularly those vehicles which are pedaled by the child, such as bicycles, tricycles and the like.

It is a further important object of this invention to provide a toy parachute device for attachment to a pedaled vehicle and selected operation thereof by the child rider of the vehicle.

Still other and further important objects and features of the invention will become apparent to those skilled in the art from consideration of the following specifications and the accompanying drawings, wherein:

FIGURE 1 is a side elevational view, somewhat in perspective, of a bicycle having mounted thereon a toy parachute device of my invention with the parachute opened up;

FIGURE 2 is an enlarged, exploded, side elevational view of the device in its preferred form;

FIGURE 3 is a fragmentary side elevational view of the parachute device in a semi-collapsed condition; and FIGURE 4 is a fragmentary side elevational view of the parachute device in a completely collapsed condition.

As shown on the drawings:

The reference numeral 10 indicates generally a toy parachute device of my invention, particularly constructed and arranged for association with a child's vehicle, such as a bicycle, indicated by the reference numeral 11. The device may be attached to other vehicles used by boys and girls, such as tricycles, wagons, and even sleds, but it is particularly intended for mounting on a pedaled vehicle capable of reaching a sufficient speed to open up the parachute automatically when the same is released.

The device 10 suitably comprises an elongated cylindrical casing 12, formed of any rigid material but preferably made of a plastic capable of resisting weather conditions. Said casing 12 is supported, as shown in FIG. 3, from the rear fender 13 of the bicycle by means of a bracket 14. The bracket 14 suitably comprises a band of metal, or the like, having an intermediate portion 15 closely encircling the casing 12 and tightened thereagainst by means of a screw and bolt 16, and having flanged extensions 17 and 18 for slipping over the rear fender 13 and resiliently engaging the same. Any suitable mounting bracket may be used for supporting the casing from the vehicle, but it is preferable that the casing be supported in line with the length of the vehicle to provide a leading end 20 and a trailing end 19.

A parachute, indicated generally by the reference numeral 21, is attached to said casing 12 in such manner that when opened the parachute extends beyond and in line with the trailing end 19 of the casing. Said parachute 21 comprises a flexible piece of cloth, fabric or the like 22, formed with finger-like extensions 23 having eyelets 24 at their ends for receiving the ends of the usual parachute cords 25. The other ends of the cords 25 are attached to an annular member 26 secured to the inside of the casing 12 within the leading end thereof.

As best shown in FIG. 2, the casing 12 is provided at its trailing end 19 with an annular ferrule 27, which may be suitably threaded onto the casing end, and that serves to retain a lens 28 in place within said trailing end of the casing. In this preferred embodiment of my invention, the leading end of the casing serves as an enclosure for a battery-powered searchlight, indicated generally by the reference numeral 30, and controlled by a switch 31 mounted in the projecting end of the searchlight assembly. When the switch 31 is turned on, the fabric of the parachute 21 is illuminated by the light projected from the lamp 32 through the remaining hollow portion of the casing 12 and out through the lens 28. Various colored fabrics can, of course, be used in making the parachute 21 and thus enhance the pleasurable effect of illuminating the parachute.

When the bicycle 11 is at rest, the parachute 21 will ordinarily be collapsed and carried in its collapsed state by the casing 12. As shown in FIG. 3, wherein the parachute 21 is in a partially collapsed state, the act of collapsing is accomplished simply by grabbing hold of the cords or strings 25 and pulling them back over the surface of the casing 12 toward the leading end thereof. When the parachute is fully collapsed, as in FIG. 4, it is held in that state by means of a releasable fastening strip 35. Said strip 35 can suitably be formed of fastening material available under the proprietary name of "Velcro," which is the hook and loop-type of fastener that simply engages by manual pressure applied normal to the surfaces of the strip. Such a strip is indicated at 35 and is wrapped around the ends of the strings 25, or the finger-like portions 23, to hold the same against the casing 12 with the parachute in a collapsed state. For convenience, the strip 35 is attached by means of a cord 36 that extends to the handle bars 37 of the vehicle 11. The end of said string 36 may be provided with a single loop 38 and said end simply wound about the handle bar 37 to secure it thereto until the rider desires to operate the parachute. Thereupon, the rider frees the looped end of the string 36, pulls it to release the strip 35 from its parachute engaging relationship, and lets the rush of air do the opening of the parachute for him. The air simply carries the parachute backward from the trailing end 19 of the casing and causes it to open up as illustrated in FIGS. 1 and 2. The opening of the parachute naturally has a slowing-down effect on the speed of the vehicle.

It will be understood that modifications and variations may be effected without departing from the scope of the novel concepts of the present invention.

I claim as my invention:

1. A toy device for use with a child's vehicle, comprising a support member for attachment to the vehicle,
a parachute associated in a collapsed state with the trailing end of said member and
means operable by the rider of said vehicle for releasing said parachute to open the same during movement of said vehicle.

2. A toy device as defined by claim 1, wherein a support member is a tubular casing to the trailing end of which said parachute is attached.

3. A toy device as defined by claim 2, wherein an electric light is mounted in the leading end of said casing and directed toward said trailing end to illuminate said parachute.

4. A toy device as defined by claim 1, wherein said means is a self-fastening strip for releasably securing said parachute in collapsed state about the trailing end of said member.

5. A toy device for use with a pedal-driven riding vehicle, comprising
a bracket for attachment to the vehicle,
an open-ended tubular casing supported by said bracket,
a parachute having cords fastened to said casing from the trailing end thereof,
releasable means for confining said parachute in a collapsed state about said trailing casing end, and
manually operated means for releasing said releasable means to permit said parachute to open.

6. A toy device as defined by claim 5, wherein a searchlight is mounted in said casing for illuminating said parachute through said open end.

7. A toy device as defined by claim 5, wherein said manually operated means comprises a string for attachment to a forward portion of said vehicle.

References Cited
UNITED STATES PATENTS

| | | | |
|---|---|---|---|
| 2,748,529 | 6/1956 | Swan | 46—228 XR |
| 3,029,049 | 4/1962 | Walker. | |

LOUIS G. MANCENE, *Primary Examiner.*

R. F. CUTTING, *Assistant Examiner.*